(12) United States Patent
Fukano et al.

(10) Patent No.: US 8,303,458 B2
(45) Date of Patent: Nov. 6, 2012

(54) AUTOMATIC SPEED REDUCTION RATIO SWITCHING APPARATUS

(75) Inventors: Yoshihiro Fukano, Moriya (JP); Toru Sugiyama, Abiko (JP); Masaki Imamura, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 358 days.

(21) Appl. No.: 12/414,958

(22) Filed: Mar. 31, 2009

(65) Prior Publication Data

US 2009/0270220 A1    Oct. 29, 2009

(30) Foreign Application Priority Data

Apr. 24, 2008  (JP) ................ 2008-113727

(51) Int. Cl.
*F16H 3/44* (2006.01)
(52) U.S. Cl. ............ 475/299; 475/317; 475/5; 74/89.23
(58) Field of Classification Search ............... 475/299, 475/317; 74/89.23
See application file for complete search history.

(56) References Cited

U.S. PATENT DOCUMENTS 7,220,205 B2 *  5/2007  Nagai et al. .............. 475/91

FOREIGN PATENT DOCUMENTS

JP    2007-92982    4/2007

* cited by examiner

*Primary Examiner* — David D Le
*Assistant Examiner* — Derek D Knight
(74) *Attorney, Agent, or Firm* — Oblon, Spivak, McClelland, Maier & Neustadt, L.L.P.

(57) ABSTRACT

An automatic speed reduction ratio switching apparatus is equipped with a sun gear connected to an input shaft, first and second carriers connected to a feed screw shaft, planetary gears meshed with the sun gear and which are mounted rotatably in the first and second carriers, and an internal gear meshed with the planetary gears and which is capable of movement in an axial direction. A packing member is arranged between the internal gear and the second carrier, for regulating movement in the axial direction of the internal gear, while enabling movement of the internal gear in the axial direction when a thrust force is applied at or above a predetermined value.

7 Claims, 7 Drawing Sheets

AUTOMATIC SPEED REDUCTION RATIO SWITCHING APPARATUS

BACKGROUND OF THE INVENTION

1. Field of the Invention

The present invention relates to an automatic speed reduction ratio switching apparatus for automatically switching a speed reduction ratio between an input shaft connected to a rotary drive source and an output shaft connected to an actuating member.

2. Description of the Related Art

Heretofore, as a means for transporting workpieces and the like, an electric actuator has been widely used, in which a feed screw is rotatably driven by a rotary drive force of a rotary drive source such as a motor or the like, for thereby displacing a slider (actuating member) that transports a workpiece.

This type of actuator is equipped with an input shaft connected to the rotary drive source, and an output shaft connected to the actuating member, and further includes a planetary mechanism, which is capable of changing a speed reduction ratio between the input shaft and the output shaft.

As equipment that is provided with such a planetary mechanism, the automatic speed reduction ratio switching apparatus disclosed in Japanese Laid-Open Patent Publication No. 2007-092982 is known. This automatic speed reduction ratio switching apparatus has a sun gear made up of a helical gear, an internal gear made up of a helical gear, and planetary gears made up of helical gears. The apparatus further comprises a planetary gear mechanism supporting the planetary gears axially for enabling rotation thereof and including a carrier that rotates integrally accompanying revolution of the planetary gears, a viscous resistance medium disposed between an inner member of the carrier that is inserted into the internal gear, the planetary gears, and the internal gear, which induces generation of a thrust force between the internal gear and the planetary gears, and a control means, which causes parallel displacement of the internal gear in the direction of the input shaft or the direction of the output shaft by means of the thrust force in accordance with an increase and decrease in the output load.

According to the aforementioned Japanese Laid-Open Patent Publication No. 2007-092982, by utilizing the viscous resistance medium, in accordance with an increase and decrease in the output load, the internal gear is displaced in parallel in the direction of the input shaft or the direction of the output shaft as a result of the thrust force. Owing thereto, rotational movement of the internal gear is controlled, whereby switching of the speed reduction ratio is performed automatically by switching between rotation and revolution of the planetary gears.

However, since grease, for example, is used to provide the viscous resistance, the viscosity (resistance value) of the grease tends to vary due to changes in temperature, and there is also concern that leakage of the grease may be brought about. Thus, a problem exists in that torque characteristics of the electric actuator are subject to variation.

SUMMARY OF THE INVENTION

In view of the above problems, the present invention has an object to provide an automatic speed reduction ratio switching apparatus that is not influenced by temperature changes or the like, and which is capable of reliably obtaining a fixed (fixed quantitative) torque characteristic by means of a simple mechanical structure.

The present invention relates to an automatic speed reduction ratio switching apparatus for automatically switching a speed reduction ratio between an input shaft connected to a rotary drive source and an output shaft connected to an actuating member.

The automatic speed reduction ratio switching apparatus according to the present invention includes a sun gear connected to an input shaft, a carrier connected to an output shaft, a planetary gear mounted rotatably in the carrier while being meshed with the sun gear, an internal gear meshed with the planetary gear and which is capable of displacement in axial directions, a thrust force generating mechanism that generates a thrust force between the internal gear and the planetary gear, a rotation regulating mechanism that regulates rotational movement of the internal gear when the internal gear is displaced in at least one of the axial directions, and a slide resistance member arranged between the internal gear and the carrier for regulating movement in the axial directions of the internal gear, and for enabling displacement of the internal gear in the axial directions when the thrust force is applied at or above a predetermined value.

In accordance with the present invention, the slide resistance member is arranged between the internal gear and the carrier, such that when the thrust force is applied at or above the predetermined value, displacement of the internal gear in the axial directions is made possible. Owing thereto, compared to a structure that uses a viscous resistance medium, fluctuations in the resistance value due to changes in temperature, and leakage of the viscous resistance medium, do not occur, so that under normal operation, a fixed quantitative torque characteristic can be maintained. Consequently, automatic switching of the speed reduction ratio can be effected with high precision by means of a simple mechanical structure.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
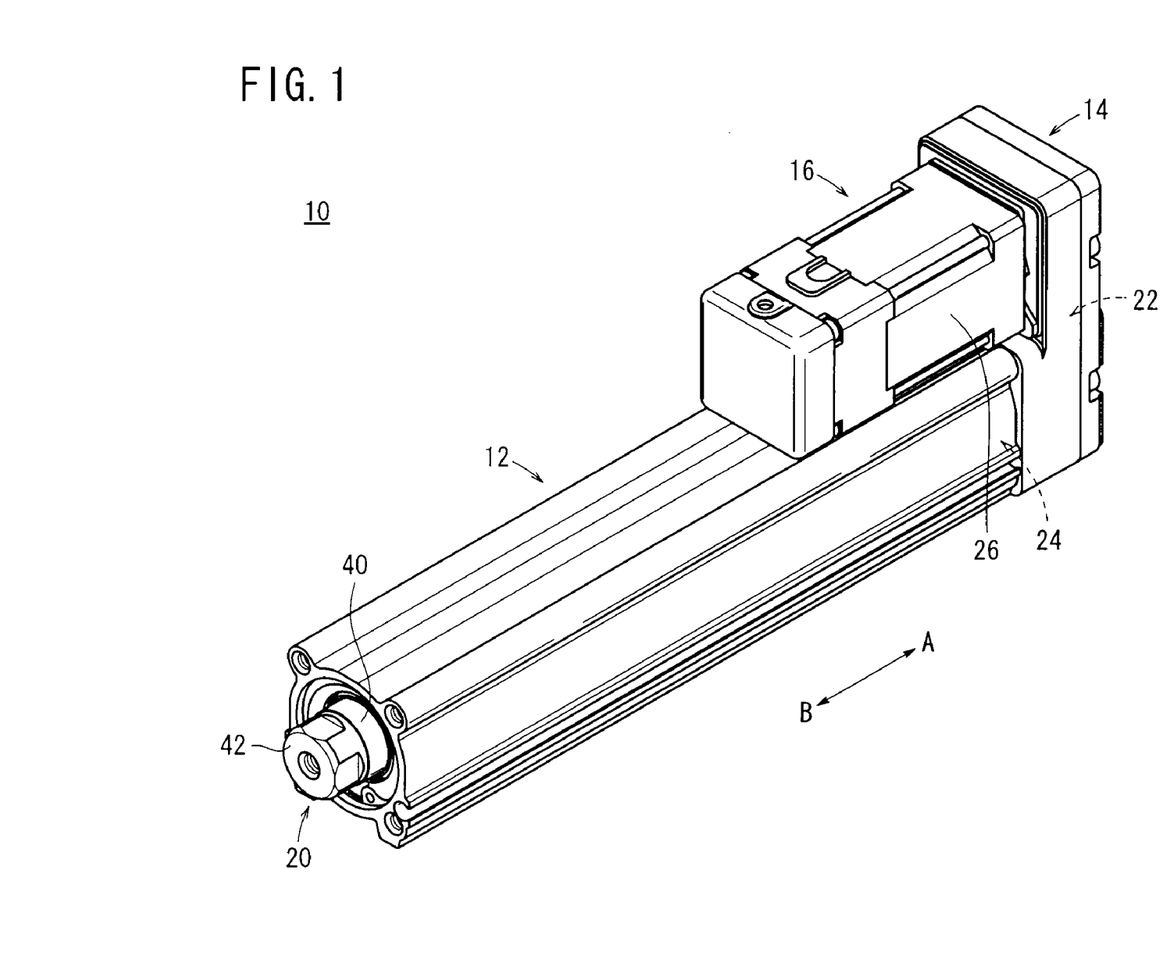
FIG. 1 is an exterior perspective view of an electric actuator in which an automatic speed reduction ratio switching apparatus according to an embodiment of the present invention is incorporated.

FIG. 1 is an exterior perspective view of an electric actuator 10 in which an automatic speed reduction ratio switching apparatus 24 according to an embodiment of the present invention is incorporated. The automatic speed reduction ratio switching apparatus 24 is not restricted to use in an electric actuator as described below, but is capable of being used in various other types of equipment.

Figure 2:
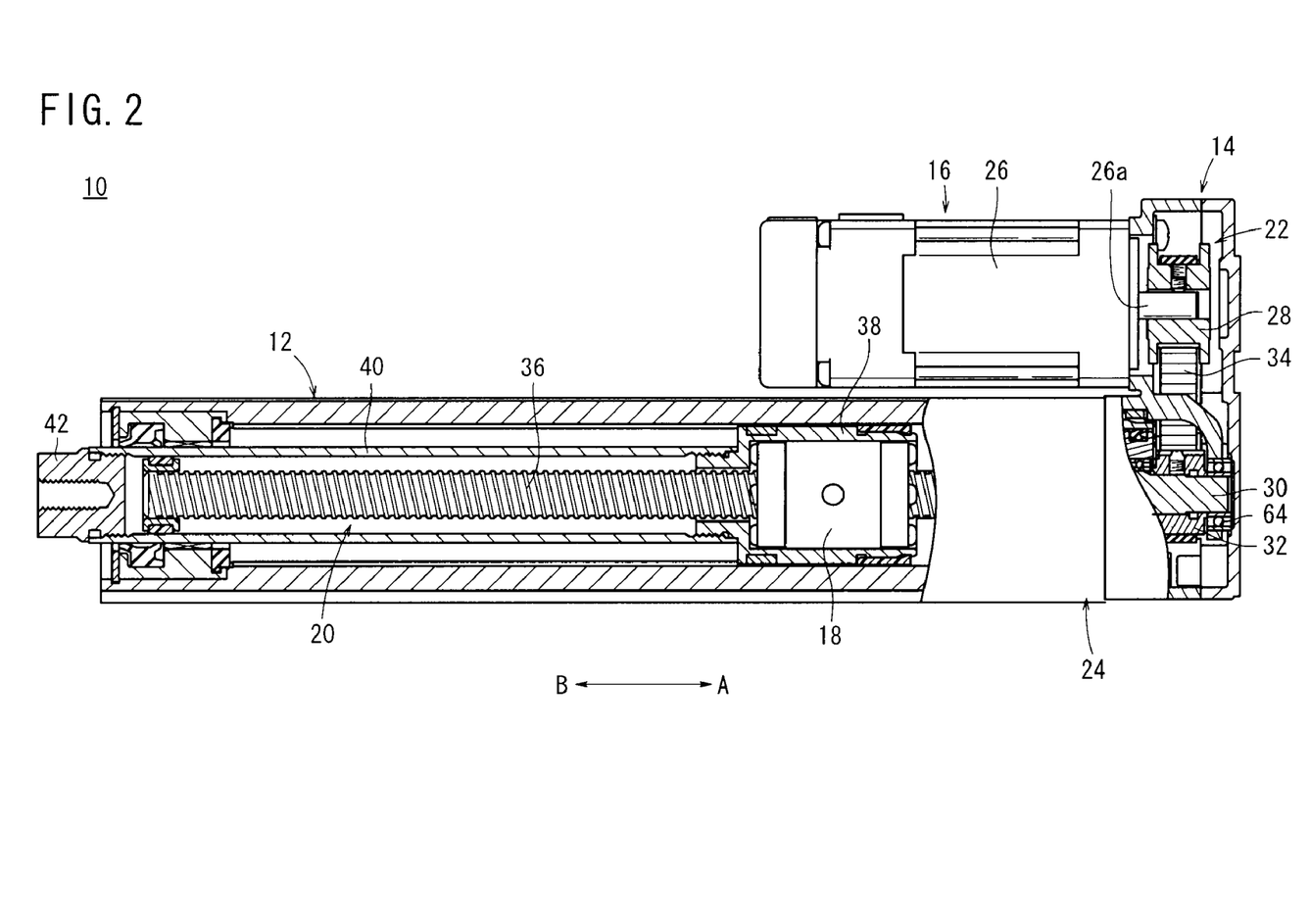
FIG. 2 is a cross sectional explanatory view showing the electric actuator.

As shown in FIGS. 1 and 2, the electric actuator 10 comprises an elongate body 12 extending in an axial direction (the direction of arrows A and B), a cover unit 14 connected to one end of the body 12, a driving section 16 which is disposed in parallel to the body 12 and rotatably driven by an electric signal, a displacement mechanism 20 provided inside the body 12 and having a displacement nut 18 which is displaceable over a given stroke by a drive force from the driving section 16, a drive force transmission mechanism 22 for transmitting the drive force from the driving section 16 to the displacement mechanism 20, and the automatic speed reduction ratio switching apparatus 24 according to the present embodiment, which is capable of varying the speed and transmitting the driving force transmitted from the driving section 16 to the displacement mechanism 20.

The driving section 16 comprises a rotary drive source 26 constituted, for example, by a DC motor, a stepping motor or the like, which is driven rotatably by an electric current supplied thereto from an unillustrated power source. The drive force transmission mechanism 22, as shown in FIG. 2, comprises a drive pulley 28 connected to a drive shaft 26a of the rotary drive source 26, a driven pulley 32 mounted on an input shaft 30, and a timing belt 34 suspended between the drive pulley 28 and the driven pulley 32. The drive force transmission mechanism 22 is accommodated inside the cover unit 14.

The displacement mechanism 20 includes a feed screw shaft (output shaft) 36 accommodated inside the body 12, the displacement nut 18 screw-engaged with the feed screw shaft 36, a piston 38 installed on an outer circumferential side of the displacement nut 18, a piston rod 40 connected to an end of the piston 38, and a socket (actuating member) 42 fitted to an end of the piston rod 40.

Figure 3:
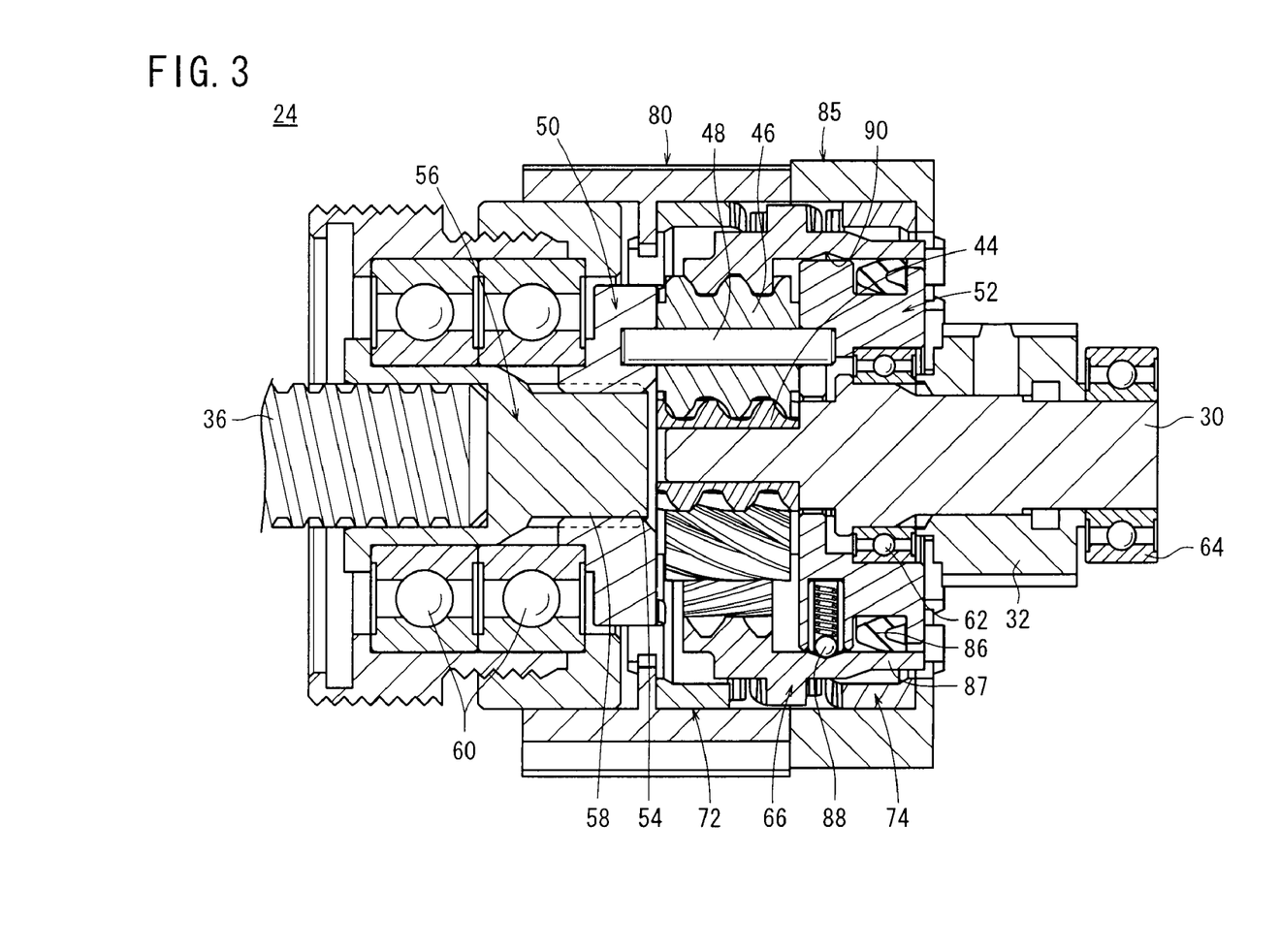
FIG. 3 is a cross sectional explanatory view showing the automatic speed reduction ratio switching apparatus.
Figure 4:
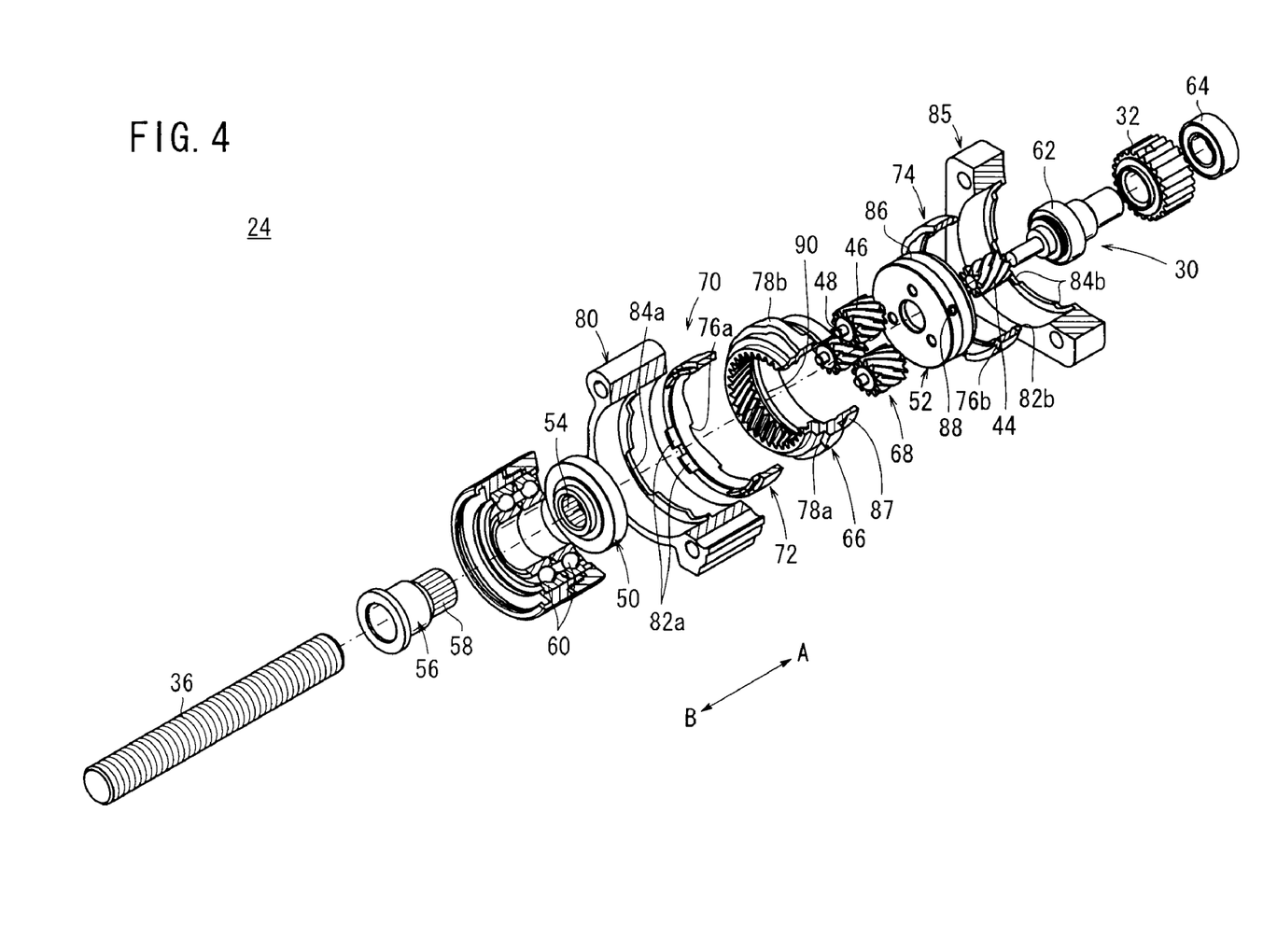
FIG. 4 is an exploded perspective view with partial omission showing the automatic speed reduction ratio switching apparatus.
Figure 5:
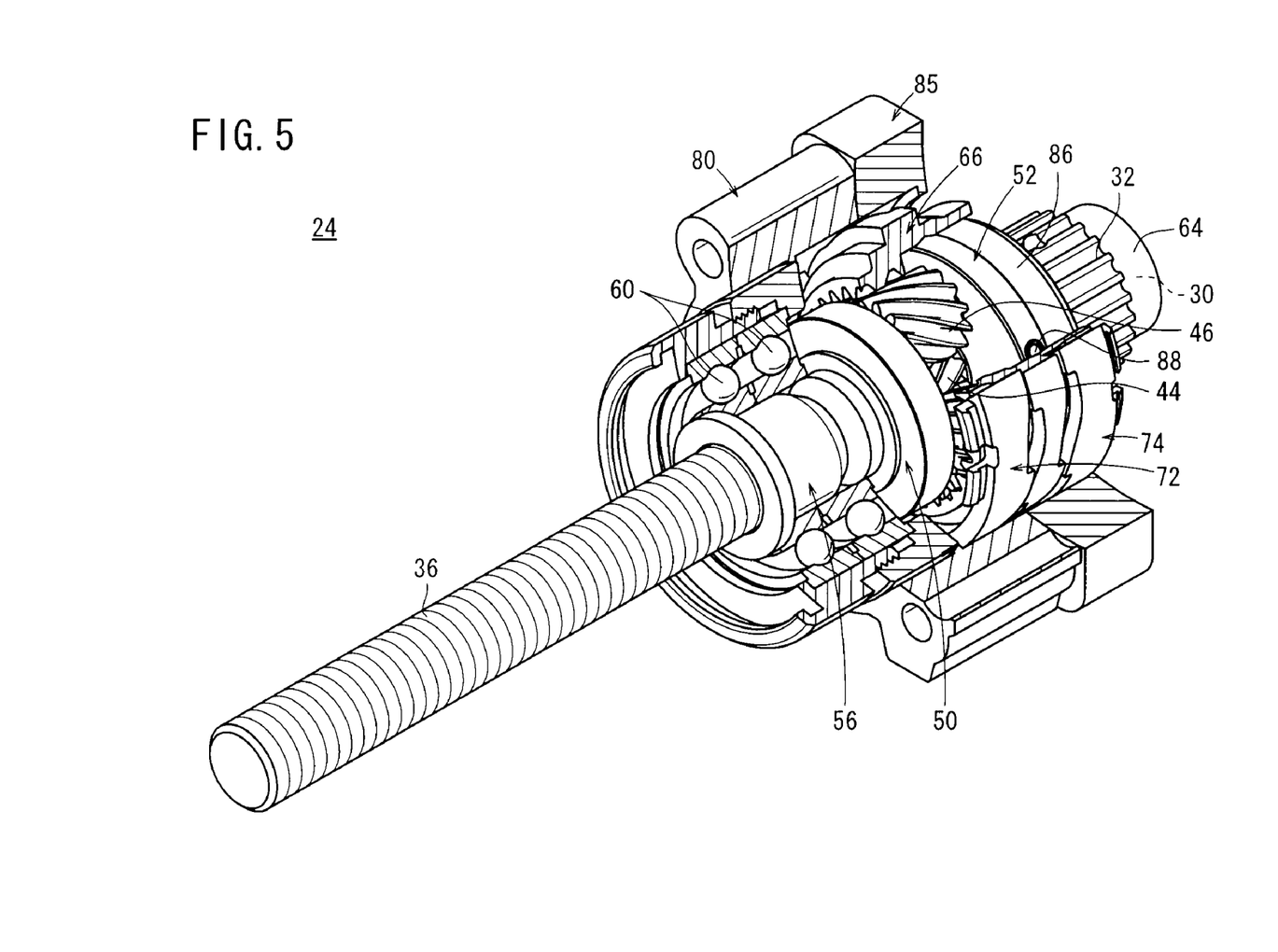
FIG. 5 is a perspective view with partial omission showing the automatic speed reduction ratio switching apparatus.

The automatic speed reduction ratio switching apparatus 24, as shown in FIGS. 3 to 5, is equipped with a sun gear 44 fixed to a distal end of the input shaft 30. A plurality, e.g., three, planetary gears 46 are meshed with the sun gear 44. Each of the planetary gears 46 is rotatably supported at both ends thereof by a first carrier 50 and a second carrier 52 via respective pins 48.

A spline hole 54 is formed in the center of the first carrier 50, with a spline shaft portion 58 of a connecting shaft 56 being meshed and fitted into the spline hole 54. One end of the feed screw shaft 36 is inserted into and affixed to the connecting shaft 56. The connecting shaft 56 and the first carrier 50 are rotatably supported in the body 12 through bearings 60. The input shaft 30 is rotatably supported in the second carrier 52 and in the cover unit 14 through bearings 62 and 64.

Each of the planetary gears 46 is meshed integrally with an enlarged diameter internal gear 66. The sun gear 44, the planetary gears 46 and the internal gear 66 are constructed respectively as helical gears, thereby constituting a thrust force generating mechanism 68, which generates a thrust force between the internal gear 66 and the planetary gears 46.

Moreover, the automatic speed reduction ratio switching apparatus 24 is equipped with a rotation regulating mechanism 70, which regulates rotational movement of the internal gear 66 when the internal gear 66 is displaced in the axial directions (the directions of arrows A and B). The rotation regulating mechanism 70 comprises a first lock up ring (locking ring) 72 arranged in one axial direction side (the direction of the arrow B) of the internal gear 66, and a second lock up ring (locking ring) 74 arranged in the other axial direction side (the direction of the arrow A) of the internal gear 66.

As shown in FIG. 4, on one end side surface of the first lock up ring 72, plural first claw members 76a are provided, while in addition, plural first claw members 78a, which engage with the first claw members 76a and thereby maintain the internal gear 66 in a non-rotatable state, are formed on the internal gear 66. Moreover, on one end surface of the second lock up ring 74, plural second claw members 76b are provided, while in addition, plural second claw members 78b, which engage with the second claw members 76b and thereby maintain the internal gear 66 in a non-rotatable state, are formed on the internal gear 66.

Figure 6:
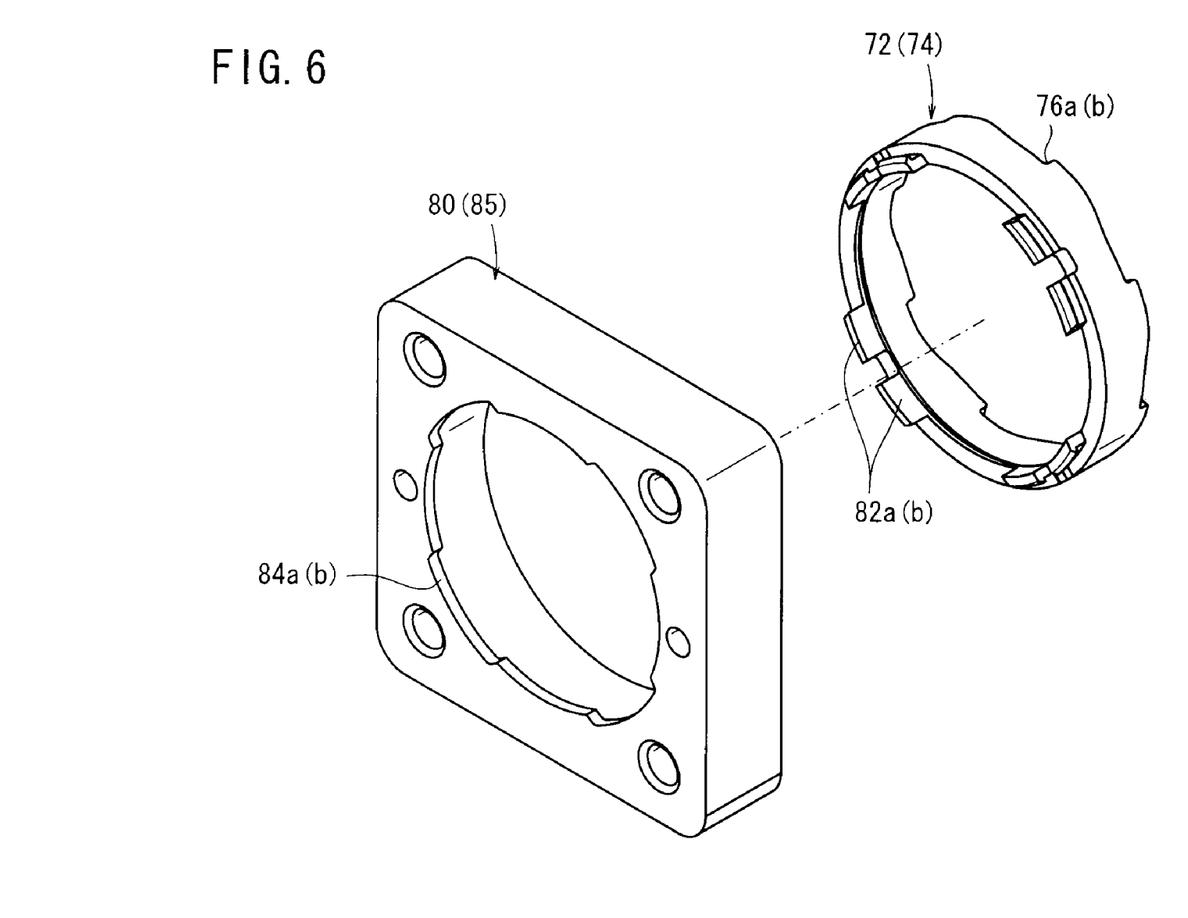
FIG. 6 is an exploded perspective view of a lock up ring and a casing constituting the automatic speed reduction ratio switching apparatus.

The first lock up ring 72 is disposed inside a first casing 80. As shown in FIGS. 4 and 6, first fixing tabs (e.g., snap-fits) 82a are provided on the first lock up ring 72, whereas plural grooves 84a, into which the first fixing tabs 82a are inserted to hold the first lock up ring 72 in a non-rotatable state, are provided in the first casing 80.

The second lock up ring 74, similarly, is disposed inside a second casing 85. Plural second fixing tabs (e.g., snap-fits) 82b are provided on the second lock up ring 74, whereas grooves 84b, into which the second fixing tabs 82b are inserted to hold the second lock up ring 74 in a non-rotatable state, are provided in the second casing 85.

Between the internal gear 66 and the second carrier 52, a slide resistance member, for example, a packing member 86, is disposed, which regulates displacement of the internal gear 66 in the axial directions, while also enabling displacement of the internal gear 66 in the axial directions when a thrust force is applied, which is equal to or greater than a predetermined value. The packing member 86, for example, is installed on the outer circumference of the second carrier 52. The internal gear 66 further comprises an outer member 87 which is externally fitted over the second carrier 52, such that the packing member 86 is held in sliding contact along an inside circumference of the outer member 87. It is also possible for the packing member 86 to be mounted on the inner circumference of the outer member 87.

A plurality of ball plungers 88, each of which are separated by a given angular interval, are installed into the outer circumference of the second carrier 52. A groove 90 is formed on the inner circumferential surface of the outer member 87 of the internal gear 66. Balls, which constitute components of each of the ball plungers 88, and which are biased in a radial outward direction respectively by springs, are disposed in sliding contact with the groove 90.

Operations of the automatic speed reduction ratio switching apparatus 24, in relation to the electric actuator 10, shall be explained below.

At first, by supplying a current to the driving section 16 from an unillustrated power source, the drive pulley 28 is rotatably driven through the drive shaft 26a of the rotary drive source 26, whereby the rotary drive force thereof is transmitted to the driven pulley 32 through the timing belt 34. Consequently, the input shaft 30 connected to the driven pulley 32 is rotated, for example, in a clockwise direction as viewed from the side of the cover unit 14.

As shown in FIG. 3, the sun gear 44 is fixed axially onto the input shaft 30, and the sun gear 44 is rotated. When rotation having a low load is transmitted to the input shaft 30, the packing member 86, serving as a slide resistance member, is installed on the outer circumference of the second carrier 52, whereupon through static frictional force between the packing member 86 and the inner circumferential surface of the outer member 87 of the internal gear 66, the planetary gears 46 do not rotate but revolve. Accordingly, the internal gear 66 rotates in the same direction (clockwise) integrally with the first and second carriers 50, 52.

The connecting shaft 56 is spline-connected to the first carrier 50, and the feed screw shaft 36, which is fixed to the connecting shaft 56, rotates integrally with the first carrier 50. Owing thereto, the displacement nut 18 is displaced integrally with the piston 38, for example, in the direction of the arrow B, whereupon the piston rod 40 and the socket 42 also are displaced in the direction of the arrow B.

Figure 7:
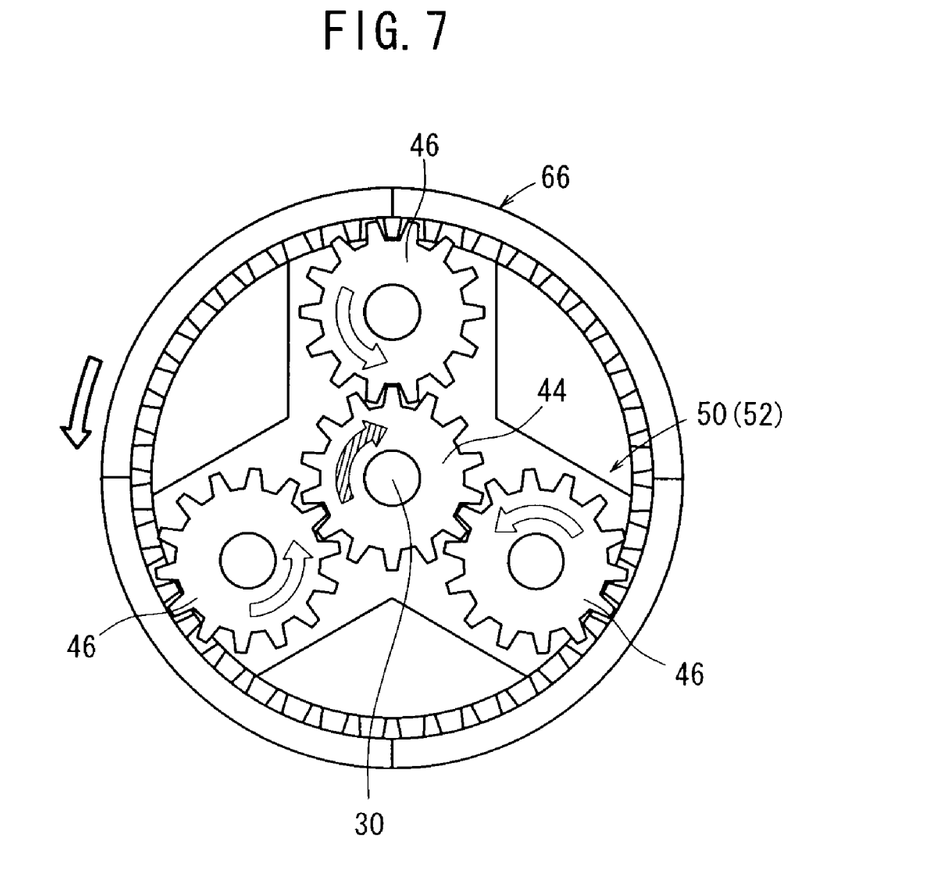
FIG. 7 is an explanatory view showing a meshed state of helical gears that make up the automatic speed reduction ratio switching apparatus.

When a load is applied externally to the feed screw shaft 36 through the socket 42, which is in excess of a preset torque, as a result of rotation of the sun gear 44, the planetary gears 46 begin to rotate while also revolving. Accordingly, the internal gear 66, which is meshed with the planetary gears 46, rotates in an opposite direction (counterclockwise) with respect to the first and second carriers 50, 52 (see FIG. 7).

At this time, due to rotational resistance, a thrust force is applied to the internal gear 66 in the axial direction through the thrust force generating mechanism 68. In addition, when a thrust force is generated, which is at or above a predetermined value, the internal gear 66 is displaced, for example, in the direction of the arrow B, while rotating in opposition to the sliding frictional force with the packing member 86, and in opposition to the engagement resistance from each of the ball plungers 88 and the groove 90.

When the internal gear 66 is displaced in the direction of the arrow B, the first claw members 78a engage with the first claw members 76a of the first lock up ring 72, whereupon the internal gear 66 is held in a non-rotating state through the first lock up ring 72. Accordingly, under a rotating action of the sun gear 44, the planetary gears 46, while rotating, revolve in the same direction of rotation as the sun gear 44, integrally with the first and second carriers 50, 52. As a result thereof, a rotational speed, which is reduced in velocity with respect to the rotational speed of the input shaft 30, and an increased torque are transmitted to the feed screw shaft 36.

On the other hand, when the input shaft 30 is rotated, for example, in a counterclockwise direction through the rotary drive source 26, and a load is applied to the feed screw shaft 36, which is in excess of a preset torque, the internal gear 66 is displaced in the direction of the arrow A, and is supported non-rotatably through the second claw members 76b, 78b with respect to the second carrier 52. Accordingly, due to rotation of the sun gear 44 via the input shaft 30, the planetary gears 46, while rotating, revolve integrally with the first and second carriers 50, 52, and a reduced-velocity rotational speed and an increased torque are transmitted to the feed screw shaft 36.

In this case, according to the present embodiment, the sun gear 44, the planetary gears 46 and the internal gear 66, each are constituted by helical gears, and the packing member 86 serving as a slide resistance member is disposed between the internal gear 66 and the second carrier 52. Consequently, for example, compared to a structure that uses a viscous resistance medium such as grease or the like, fluctuations in the resistance value due to changes in temperature, and leakage of the viscous resistance medium, do not occur, and when a thrust force is applied at or above a predetermined value, the internal gear 66 can be displaced reliably in the axial directions.

As a result, with the present embodiment, under normal operation, a fixed (fixed quantitative) torque characteristic can be maintained, and automatic switching of the speed reduction ratio can be effected with high precision by means of a simple mechanical structure.

The predetermined value of the thrust force generated on the internal gear 66 by the helical gears, may be set according to conditions such as the torsion angle of the helical gears, the resistance from the packing member 86, the spring force of the ball plungers 88, and the shape of the groove 90, etc.

Further, with the present embodiment, a plurality of ball plungers 88 are installed in the outer circumferential surface of the second carrier 52, and a groove 90, in which balls of the ball plungers 88 are capable of slidably contacting, is disposed on the inner circumferential surface of the outer member 87 of the internal gear 66. Accordingly, the internal gear 66 becomes displaceable with respect to the second carrier 52 in an axial direction only when a thrust force is applied, which is equal to or greater than a predetermined value, whereby the timing at which the speed reduction is switched can be fixed quantitatively.

Still further, according to the present embodiment, plural first fixing tabs 82a are provided on one end in the axial direction of the first lock up ring 72, whereas plural grooves 84a, into which the first fixing tabs 82a are inserted, are provided in the first casing 80. Owing thereto, simply by insertion of the first fixing tabs 82a into the grooves 84a, the first lock up ring 72 can become fixed with respect to the first casing 80, so that a specialized screw-clamping structure is not required. Consequently, since management of torque for purposes of screw-clamping is unnecessary, the number of parts and assembly steps can be reduced, and productivity is enhanced.

In particular, by constructing the first fixing tabs 82a with snap-fits, the fixing operation of the first lock up ring 72 can be further simplified. In this case, so long as the first fixing tabs 82a prevent rotation of the first lock up ring 72, consideration of a fixing structure for an axial direction is unnecessary. Consequently, the structure of the apparatus is further simplified.

Although a certain preferred embodiment of the present invention has been shown and described in detail, it should be understood that various changes and modifications may be made to the embodiment without departing from the scope of the appended claims.

What is claimed is:

1. An automatic speed reduction ratio switching apparatus for automatically switching a speed reduction ratio between an input shaft connected to a rotary drive source and an output shaft connected to an actuating member, comprising:
   a sun gear connected to the input shaft;
   a carrier connected to the output shaft;
   a planetary gear mounted rotatably in the carrier and meshed with the sun gear;
   an internal gear meshed with the planetary gear and which is capable of displacement in axial directions;
   a thrust force generating mechanism that generates a thrust force between the internal gear and the planetary gear;
   a rotation regulating mechanism that regulates rotational movement of the internal gear when the internal gear is displaced in at least one of the axial directions; and
   a slide resistance member arranged between the internal gear and the carrier for regulating movement in the axial directions of the internal gear, and for enabling displacement of the internal gear in the axial directions when the thrust force is applied at or above a predetermined value, the slide resistance member comprising only a packing member without a viscous resistance medium,
   wherein the planetary gear revolves instead of rotate due to a static frictional force between the packing member and an inner circumferential surface of an outer member of the internal gear when a rotation having a low load is transmitted to the input shaft.

2. The automatic speed reduction ratio switching apparatus according to claim 1, wherein the thrust force generating mechanism is constituted by the sun gear made up of a helical gear, the planetary gear made up of a helical gear, and the internal gear made up of a helical gear.

3. The automatic speed reduction ratio switching apparatus according to claim 1, wherein:
- a ball plunger is provided in an outer circumferential surface of the carrier, and
- a groove, in which the ball plunger is capable of engagement, is formed on an inner circumferential surface of the internal gear.

4. The automatic speed reduction ratio switching apparatus according to claim 1, the rotation regulating mechanism comprising a locking ring, which is disposed non-rotatably in at least one axial direction side of the internal gear,
wherein claw members, which non-rotatably engage the internal gear, are disposed respectively on the locking ring and the internal gear.

5. The automatic speed reduction ratio switching apparatus according to claim 4, further comprising a casing for securing the locking ring therein,
wherein a fixing tab is provided on the locking ring, and a groove, into which the fixing tab is inserted for non-rotatably retaining the locking ring therein, is provided in the casing.

6. The automatic speed reduction ratio switching apparatus according to claim 1, wherein the packing member is disposed on an outer circumferential surface of the carrier, or on the inner circumferential surface of the outer member of the internal gear that is externally fitted over the carrier.

7. The automatic speed reduction ratio switching apparatus according to claim 6, wherein the packing member is held in sliding contact along the inside circumferential surface of the outer member of the internal gear that is externally fitted over the carrier.

* * * * *